United States Patent
Kruse et al.

(10) Patent No.: US 9,313,230 B1
(45) Date of Patent: Apr. 12, 2016

(54) POLICY APPROVAL LAYER

(71) Applicant: Amazon Technologies, Inc., Reno, NV (US)

(72) Inventors: William Frederick Kruse, Seattle, WA (US); Nima Sharifi Mehr, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/493,212

(22) Filed: Sep. 22, 2014

(51) Int. Cl.
*G06F 17/00* (2006.01)
*H04L 29/06* (2006.01)
*G06F 17/50* (2006.01)
*G06F 11/00* (2006.01)

(52) U.S. Cl.
CPC ............. *H04L 63/20* (2013.01); *G06F 11/004* (2013.01); *G06F 17/5009* (2013.01); *G06F 2221/00* (2013.01)

(58) Field of Classification Search
CPC ...................................................... H04L 63/20
USPC .............................................................. 726/1
See application file for complete search history.

(56) References Cited

U.S. PATENT DOCUMENTS

| | | | |
|---|---|---|---|
| 4,868,877 A | | 9/1989 | Fischer |
| 7,383,568 B1 * | | 6/2008 | Newstadt ............ H04L 63/0263 726/1 |
| 2003/0046576 A1 | | 3/2003 | High et al. |
| 2005/0114672 A1 | | 5/2005 | Duncan et al. |
| 2007/0051808 A1 | | 3/2007 | Adams et al. |
| 2008/0040774 A1 | | 2/2008 | Wang et al. |
| 2009/0222903 A1 | | 9/2009 | Sherkin et al. |
| 2010/0098248 A1 | | 4/2010 | Anantharaman |
| 2013/0219140 A1 | | 8/2013 | Hanson et al. |
| 2014/0196103 A1 | | 7/2014 | Chari et al. |

* cited by examiner

*Primary Examiner* — Peter Shaw
(74) *Attorney, Agent, or Firm* — Davis Wright Tremaine LLP

(57) ABSTRACT

A customer of a policy management service may use an interface with a configuration and management service to interact with policies that may be applicable to the customer's one or more resources. The customer may create and/or modify the policies and the configuration and management service may notify one or more other entities of the created and/or modified policies. The one or more other entities may be operated by user authorized to approve the created and/or modified policies. Interactions with the configuration and management service may be the same as the interactions with the policy management service.

19 Claims, 8 Drawing Sheets

POLICY APPROVAL LAYER

BACKGROUND

Resource owners and other administrators of resources often grant users access to resources to support the business needs of the resource owners, administrators and the users themselves. Modern computing systems place a high importance on security of user access to system resources and on maintaining a repository of secure and accurate records of roles, permissions and/or policies associated with computing system users. In a computing system where many users may have several assigned roles, permissions and/or policies associated with and relating to many different computing system resources, devices, entities, file systems and the like, the repository of user roles, permissions and/or policies can grow increasingly complex, particularly as the size and/or complexity of the system and/or the number of computing system users increases.

Accordingly, a resource owner may want to grant other users access to resources in order to perform one or more actions on behalf of the resource owner while ensuring the security of resources. In order to manage user privileges, a resource owner may delegate authority to a number of administrators or other owners of the resource such that each of the administrators and owners may define and manage user privileges. Generally, in large-scale and other computing environments, determining who has the ability to perform a given action on a resource can present some challenges. Further, the goals of keeping privileges current can compete with other goals. A centralized system for managing privileges, for example, can have the advantage of effectively immediate updates to privileges while having the disadvantage of a potential loss of availability.

BRIEF DESCRIPTION OF THE DRAWINGS

Various embodiments in accordance with the present disclosure will be described with reference to the drawings, in which.

DETAILED DESCRIPTION

Figure 1:
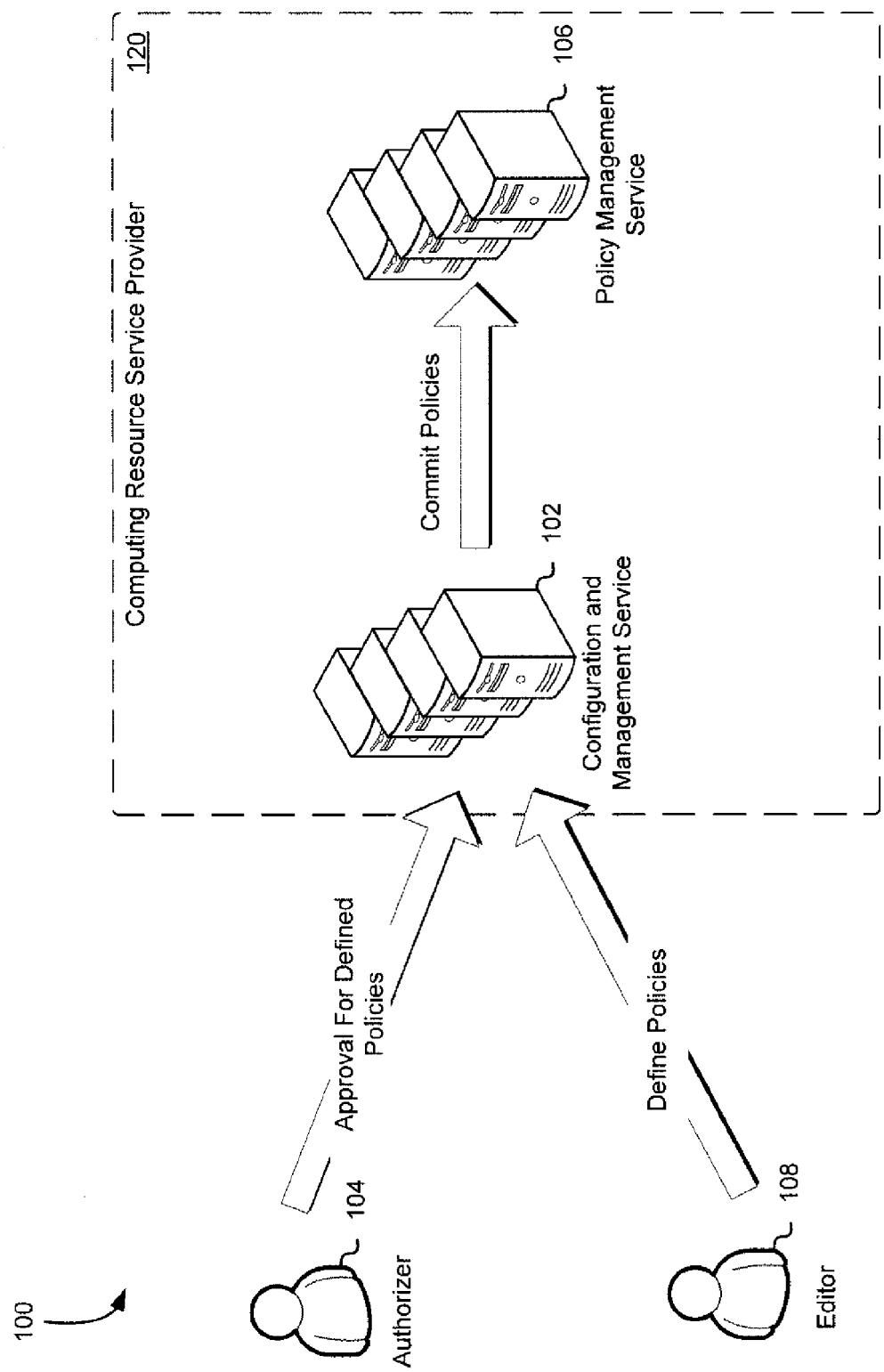
FIG. 1 illustrates an example environment in which users of different roles may modify, review, and update permissions and/or policies in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include the use of a configuration and management service as a layer (intermediary) between users and a policy management service. The configuration and management service may provide a mechanism for users to create, modify, and interact with policies maintained by the policy management service while requiring at least some level of approval before committing modifications to the policy management service. Furthermore, the configuration and management service maintains a repository of policy information enabling the policy management service to be rolled back or otherwise restored to a previous state of the policies. In an embodiment, a user (e.g., an administrator) of an organization communicates with the configuration and management service, such as through one or more application programming interface (API) calls, to request creation of a policy that may, for example, be utilized to establish, for one or more users, a level of access to one or more resources provisioned by the organization. The organization may be a customer of a computing resource service provider that utilizes one or more services such as a virtual computer system service, object-based data storage services, database services, the aforementioned policy management service and configuration and management service as well as a plurality of other services to create and manage resources and to support business needs.

The configuration and management service may be configured with the same APIs as the policy management service, thereby enabling users to interact with it in the same manner as when interacting with policies and/or policy information maintained by the policy management service. In some embodiments, a user interface (e.g., a console) may be used to enable the user to interact with the configuration and management service and/or policy management service, the user interface may then generate and transmit API calls to the corresponding service based at least in part on the user's interaction with the user interface. Interactions with the configuration and management service may require approval from another user before the configuration and management service commits the interactions to the policy management service. For example, an editor may interact with the configuration and management service and modify an existing policy. The configuration and management service may then transmit the modification to an auditor for approval before applying the modifications to the policies maintained by the policy management service.

In various embodiments, when a user attempts to interact with a policy set maintained by the policy management service, the configuration and management service is configured to obtain a snapshot of the policy set from the policy management service, store the snapshot of the policy set, and enable the user to modify the stored snapshot of the policy set. The snapshot of the policy set may include information representing the current state of the policy information maintained by the policy management service for the organization, such as roles, permissions, credentials, rights, policies, and permissions. Once the user has finished making changes to the policy set, the user may add a description of the changes, or the configuration and management service may determine a description of the changes. Furthermore, a second snapshot of the policy set may be generated including the changes made by the user.

The configuration and management service may then transmit the changes to the policy set and corresponding description to one or more other users for review. For example, changes to the policy set of a particular organization may require approval from a quorum of particular users of the organization such as administrators. In another example, an editor may make changes to the policy set which may require approval from an approver but may only be committed by the configuration and management service to the policy management service in response to a command from an administrator. Once the configuration and management service has committed modification to the policy management service, the policy management service may alter computing resources of the organization according to the modified policy. For example, once approved the configuration and management service may commit new user information, including roles and access rights of the new user, to the policy management service. The policy management service may then alter the computing resources corresponding to the new user's roles and access rights to enable the new user to interact with the computer resources for which permission was granted by the roles and access rights.

FIG. 1 is an illustrative example of an environment 100 in which modification to policy information may be made through interactions with a configurations and management service 102 and approved before committing the modifications to a policy management service 106. The policy management service 106 may provide a policy management system that is configured to enable customers to define a level of access and the ability to perform a set of actions to users of computing resources of a computing resource service provider 120 provisioned by the customers. In various embodiments, the computer resources may be operated and/or maintained by the customers but the policies and access control of the computing resources may be managed by the computing resource service provider 120 or component thereof such as the policy management service 106. The policy management service enables customers, administrators, and other users of an organization with access to computing resources to request creation of a policy that includes one or more actions that may be performed by one or more delegated users of the computing resource in order to support the business needs of the customers, the administrators, and/or the individual users themselves. The policy management service 106 may comprise one or more components which may collectively be configured to enable resource owners to generate and manage policies and to further make these policies available to the various target computing resources and their users. Resource owners may include organizations and other entities operating and maintaining computing resources for use by the organization and other entities. Resource owners may also include organization and other entities utilizing computing resources operated and maintained by a third party, such as a computing resource service provider 120, who has granted the organization the ability to perform various actions using the third party's computing resources.

In various embodiments, the configuration and management service 102 may be placed in front of the policy management service 106 such that changes made to one or more policies for defining one or more actions that may be performed by a user on a particular computing resource may be reviewed and/or approved before the policy management service 106 modifies or configures the computing resource according to the one or more policies. The configuration and management service 102 may comprise one or more components which may collectively be configured to enable resource owners to generate and manage policies and to further obtain approval for generation and modification of the managed polices. In various embodiments, the configuration and management service 102 has the same configuration as the policy management service 102, as described above, in order to enable users to interact with the configuration and management service 102 in the same manner as they would with the policy management service 106. The configuration and management service 102 may be a component of a client data center or other service provider and not operated by the computing resource service provider 120.

As noted above, the configuration and management service 102 as well as the policy management service 106 may be configured to enable customers and administrators of computing resources to request creation of one or more policies, modification of one or more policies, and approval of creation and/or modification of one or more policies. Accordingly, the environment 100 includes an editor 108 and an authorizer 104. The editor 108 and the authorizer 104 may be individuals, groups of individuals, or organizations that may utilize configuration and management service 102 to interact with the one or more policies for defining one or more actions that may be performed by users on computing resources managed by the policy management service 106. For example, the editor 108 may be a policy author for an organization responsible for creating polices for users of the organization. The authorizer 104 may be an administrator of the organization responsible for managing one or more polices of the organization.

The editor 108 may utilize an interface of the configuration and management service to create, modify, or interact with a policy comprising a listing of users that may utilize one or more target computing resources provisioned and/or managed by the organization and a listing of actions that may be performed by each of these users on the one or more target computing resources. For example, the editor 108 may transmit a request to the configuration and management service 102 to interact with a particular policy or set of policies maintained by the policy management service 102. In various embodiments, the request may be received at a listening device operated by the computing resource service provider 120 and redirected to the configuration and management service 102. In yet other embodiments, the computer resource service provider 120 is configured such that all requests to interact with the policy management service 106 are directed to the configuration and management service 102. Returning to FIG. 1, once a request to interact with the one or more policies is received by the configuration and management service 102, the configuration and management service may serialize or otherwise generate a snapshot of the one or more policies.

The editor 108 may then interact with the serialized one or more policies by submitting API calls to the configuration and management service 102. As described above, a user interface, such as a graphical user interface, may enable the editor 108 to interact with the serialized one or more policies without requiring the user to generate the API calls directly. The configuration and management service 102 may then generate a description of the editors 108 interaction with the serialized one or more policies, described in greater detail below. In some embodiments, the description includes the set of API calls generated by the editor 108. The description and one or more policies may then be provided to an authorizer 104. The authorizer 104 may be presented with a graphical representation of the one or more policies and description of the interactions of the editor 108. For example, the authorizer 104 may be presented with a representation of the one or more policies including redline or marked up changes made by the editor 108. The configuration and management service 102 may provide the authorizer 104 with a notification that the editor 108 has modified one or more policies that require approval from the authorizer 104. The notification may be transmitted by a notification service described in greater detail below. Furthermore, the notification may include a variety of different notifications such as an electronic mail message, short message service (SMS) message, push notification, desktop notification, or other notification suitable for requesting approval from the authorizer 104.

Once the notification is received, the authorizer may have the ability to approve or deny all or a portion of the interactions performed by the editor 108. If the authorizer 104 approves only a portion of the interactions of the editor 108, the configuration and management service 102 may then generate a new serialization of the one or more policies including only the interaction with the one or more policies approved by the authorizer 104. Returning to FIG. 1, once the configuration and management service 102 have received approval for the one or more policies and/or one or more modified policies, the configuration and management service 102 may commit the one or more policies and/or one or more modified policies to the policy management service 106. Committing policies to the policy management service 106 may cause the committed policies to be applied to a set of computing resources corresponding to the committed policies. For example, a policy may specify one or more actions a user with a particular set of credentials may perform with a particular storage device, such as reading from and writing to the storage device. Committing, by the configuration and management service 102, the policy to the policy management service 106 may cause the policy management service 106 to transmit a set of API calls to a management system of the storage device. The set of API calls may cause the management system to apply the policy and enable the one or more actions to be performed when the particular set of credentials are presented.

In various embodiments, the policy management service generates a permission model based at least in part on committed policies to execute one or more simulations of the committed policies. The permission model may include a role-based access model where the permissions to perform certain operations are assigned to specific roles. Delegated users may be assigned particular roles, and through those role assignments acquire the permissions to perform particular operations and/or actions using particular computing resources. Delegated users may not be assigned permissions directly, but may acquire permission through role assignment. For example, a delegated user may be assigned the role of authorizer granting the delegated user the permission to approve modifications to the policy. Furthermore, the authorizer's approval of the one or more policies, once given, may be contingent on a successful simulation. These simulations may be used to determine whether the policy defined by the editor 108 and approved by the authorizer 104 suffer from any errors and/or conflicts. For instance, an error or conflict may exist if an editor 108 defines a policy that both allows and denies a particular user from performing write operations on the same resource. Accordingly, if any errors and/or conflicts are discovered, the policy management service 102 may transmit one or more notifications to the configuration and management service 102 to cause one or more messages that include the nature of the errors/conflicts and highlight portions of the policy where the errors/conflicts exist to be transmitted to the authorizer 104 and/or editor. In various embodiments, a separate testing environment is used to simulate the one or more policies before the configuration and management service commits the one or more policies to the policy management service 106. Accordingly, if errors occur during the simulation, the editor 108 and/or authorizer 104 may proceed to modify the one or more policies to address these issues.

If the simulation of the graphical representation of the policy results in no errors or conflicts, the policy management service 102 may serialize the permission model into a structured format (e.g., JSON, XML, SecPol, Amazon Web Services Access Policy Language etc.) to create the policy. Subsequently, the policy management service 102 may redundantly store this newly created policy in a policy data store, described in greater detail below. The policy data store may comprise various computing hardware resources for storing and making available these policies to the various target computing resources and their users. Thus, once a policy has been created and stored within the policy data store, the policy management service 102 may apply the newly created policy to the one or more computing resources based at least in part on the resources specified within the policy. The configuration and management service may utilize the same policy data store as the policy management system or maintain an individual policy data store.

Figure 2:
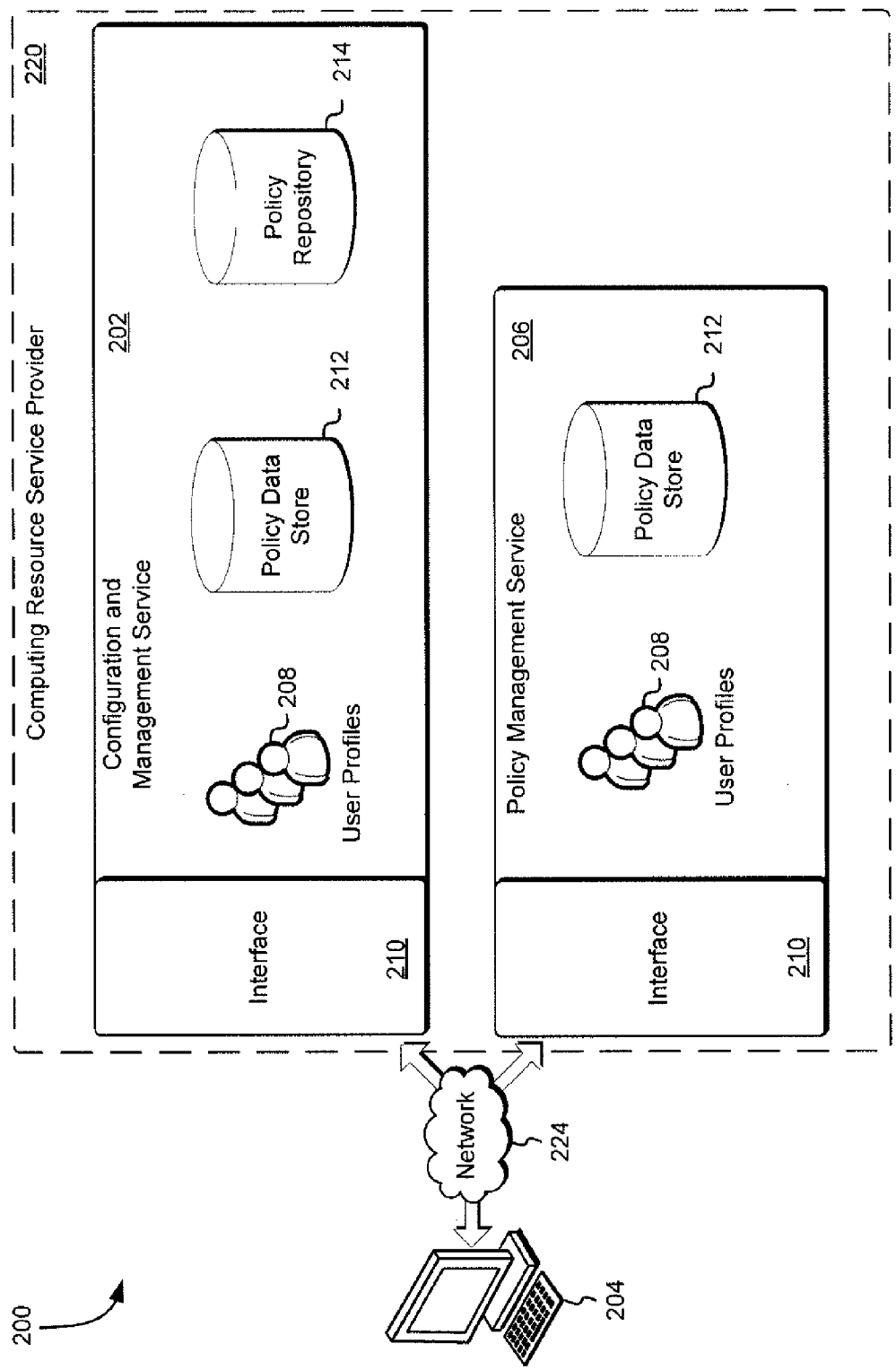
FIG. 2 illustrates an example environment in which users may interact with a configuration and management service layer associated with an administrative service in accordance with an embodiment.

FIG. 2 shows an illustrative example of an environment 200 that includes a plurality of components of a policy management service 206 and a configuration and management service 202 provided by a computing resource service provider 220 in accordance with at least one embodiment. The policy management service 206 may provide customers and other delegated users (e.g., editors and authorizers as described above in connection with FIG. 1) who have been granted administrative permissions by a customer 204 with an interface 210 that may enable the customer 204 or a delegated user to access the policy management service 206. Furthermore, the computing resource service provider 202 may be configured such that the customers and other delegated users who have been granted administrative permissions by the customer 204 to interact with the policy management service 206 may utilize the same administrative permissions to interact with the configuration and management service 202. The customer 204 and/or the delegated user may utilize the interface 210 through one or more communications networks 224 such as the Internet. The customer 204 may include an entity, where the entity is a computer system of a delegated user with permissions to interact with the policy management service 206 and/or the configuration and management service 202. For example, an entity may include a desktop computer operated by an editor creating and/or modifying one or more policies of the customer 204.

The interface 210 may comprise certain security safeguards to ensure that the customer 204 and/or the delegated user has authorization to access the policy management service 206 and/or the configuration and management service 202. For instance, in order to access the policy management service 204 and/or the configuration and management service 202, a particular customer 204 may need to provide a username and a corresponding password or encryption key when using the interface 210. Additionally, requests (e.g., API calls) submitted to the interface 210 may require an electronic signature generated using a cryptographic key such that the electronic signature is verifiable by the computing resource service provider 220 or component thereof, such as by an authorization system (not shown for simplicity). For example, an editor, as described above, may provide a username and corresponding password to obtain one or more policies for modification and may generate an electronic signature to provide an attestation that the modification to the one or more policies were generated by the editor. Similarly, an authorizer, as described above, may generate an electronic signature attesting to the authorizer's approval of the modification generated by the editor.

Through the interface 210, the customer 204 or delegated user may be able to view resources, including a listing of all users authorized to access each of the resources. Accordingly, the customer 204 or delegated user may use the interface 210 to access a user profile data store 208 to create, modify, and manage one or more users and view one or more attributes of each user (e.g., first name and last name, location, phone number, roles, permissions, rights, etc.). The user profile data store 208 may comprise various computing hardware resources for storing and making available user profile data. For example, the user profile data store 208 may include a database with one or more records corresponding to users of the customer. Additionally, through the interface 210, the customer 204 or delegated user may select a user profile or a group of user profiles from the user profile data store 208 and create one or more resource policies and define a level of access to one or more resources for a user or a group of users.

In various embodiments, the customer 204 may choose to perform these operations through to configuration and management service 202 or directly through the policy management service 206. In yet another embodiment, the credentials provided by the customer 204 to the interface 210 may determine whether the customer 204 interacts with the configuration and management service 202 or the policy management service 206. For example, if the customer 204 is assigned the role of policy author, based at least in part on information contained in the user profile data store 208 and a policy data store 212, the customer 204 may be limited to interaction with the configuration and management service 202. The policy data store 212 may be a collection of computing resources configured to store one or more policies and making available the one or more policies to the various computing resources. For example, the policy data store 212 may be a database containing one or more records indicating permissions and access policies corresponding to various computing resources.

In various embodiments, the configuration management service 202 may obtain a copy of the user profile data store 208 and the policy data store 212 from the policy management service 206. For example, as a result of receiving a request through the interface 210 to modify one or more policies, the configuration and management service 202 may obtain information from the user profile data 208 and the policy data store 212 corresponding to the one or more policies included in the request. The user profile data 208 and the policy data store 212 maintained by the policy management system 206 may be the current configuration of the customer's 204 policies. Additionally, the user profile data 208 and the policy data store 212 obtained from the policy management service 206 may contain encrypted or tokenized data. For example, username and password information maintained by the policy management service 206 may be obfuscated (e.g., encrypted or hashed) before the information is provided to the configuration and management service in order to prevent the information from being compromised.

Furthermore, the configuration and management service 202 may maintain a policy repository 214 configured to maintain a history of user profiles and policy information. The policy repository 214 may be a collection of computing resources configured to maintain a history of policies and/or modification to the policies to enable the customer 204 to restore a previous state of the policies. For example, the policy repository 214 may be a revision control system configured to track changes to the one or more policies over an interval of time. The configuration and management service 202 may generate one or more restore points based at least in part on information maintained by the policy repository 214. The one or more restore points may include various points in time at which the current state of the policy was stored or various stored-versions of the state of policy.

Furthermore, the restore points may be based at least in part on atomic, linearizable, indivisible or uninterruptible operations performed on the policy. The operations may be considered atomic, linearizable, indivisible or uninterruptible if the operations appear to the policy management system as mutually exclusive or otherwise as isolated processes capable of concurrent execution. For example, creating two new users may be two separate atomic operations if each operation may be executed in isolation from the other. The customer 204 may request through the interface 210 that the configuration and management service 202 restore a previous version (e.g., previous version number) of the one or more policies, restore the one or more policies to a previous point in time, or to restore to a previous atomic operation or set of atomic operations.

Accordingly, once the customer 204 or delegated user has defined the applicable user policies through the configuration and management service 202, the configuration and management service 202 may transmit one or more executable instructions to a policy management service 206 which may cause the policy management service 206 to generate a permission model based at least in part on the user policies created by the customer 204 or delegated user. In various embodiments, modifications to the one or more policies made by the customer 204 may be mirrors in a test environment in order to perform one or more simulations. Furthermore, the policy management sub-system 206 may be configured to utilize the permission model to perform one or more simulations and determine whether the permission model includes one or more errors or conflicts. If one or more errors or conflicts are detected, the computing resource service provider 220 or component thereof such as the configuration and management service 202 may transmit one or more notifications to the customer 204 including one or more error messages and deny creation of the policy. Additional notification may also be transmitted to other delegated users of the customer. For example, the author of the policy which generated an error as well as the authorizer responsible for approving the policy may receive the message.

If no errors or conflicts are detected after performing one or more simulations utilizing the permission model, the configuration and management service 202 may enable the customer 204 or delegated user (e.g., authorizer) to verify that he or she wants to commit the policy to the policy management service 206. For example, a customer or delegated user may select an apply button within a graphical user interface to acknowledge that he or she wants to create a policy based at least in part on a policy authored by another delegated user. Accordingly, the configuration and management service 202 may serialize the permission model and/or one or more policies into an appropriate structured format (e.g., a format that is readable and by one or more services where the resources may be located to enable the one or more services to enforce the policy) and provide the policy management service. In various embodiments, the configuration and management service 202 may provide the policy management service 202 with a set of API calls configured to cause the policy management service 202 to serialize the permission model and/or one or more policies into an appropriate structured format.

The policy management service may include the generated policy in the one or more applicable user profiles within the user profile data store 208 and may persistently store the generated policy within a policy data store 212. Once the policy has been created and persistently stored within the policy data store 212, the policy management service 206 may either transmit the generated policy to one or more services or computing resources where the applicable resources may be located or may transmit one or more API calls to the policy data store 212 to provide the generated policy to the one or more services or computing resources. Accordingly, the one or more services or computing resources may enforce the generated policy and grant users or deny users the ability to perform one or more operations using resources provisioned by the customer or managed by one or more delegated users.

At any time, the customer 204 or delegated user may access the configuration and management service 202 though the interface 210 in order to view and/or modify any existing policy that may be persistently stored within the policy data store 212 or the policy repository 214. For instance, a customer 204 or delegated user may utilize the interface 210 to access the user profile data store 208 to select a user profile and, from the selected user profile, identify a policy that has been applied to the user profile. The interface 210 may transmit one or more executable instructions to the policy management service 206, which may cause the policy management service to provide the policy data store 412 and the user profile data store 208 to the configuration management service 202. Thus, the customer 204 or delegated user may be able to review an existing policy, even if the existing policy was not originally created using the configuration and management service 202 and/or stored in the policy repository 214. In various embodiments, if the requested policies are included in the policy repository 214, the configuration and management service 202 may obtain the user profile data store 208 and the policy data store 212 from the policy repository 214 without requesting the user profile data store 208 and the policy data store 212 from the policy management service 206.

Figure 3:
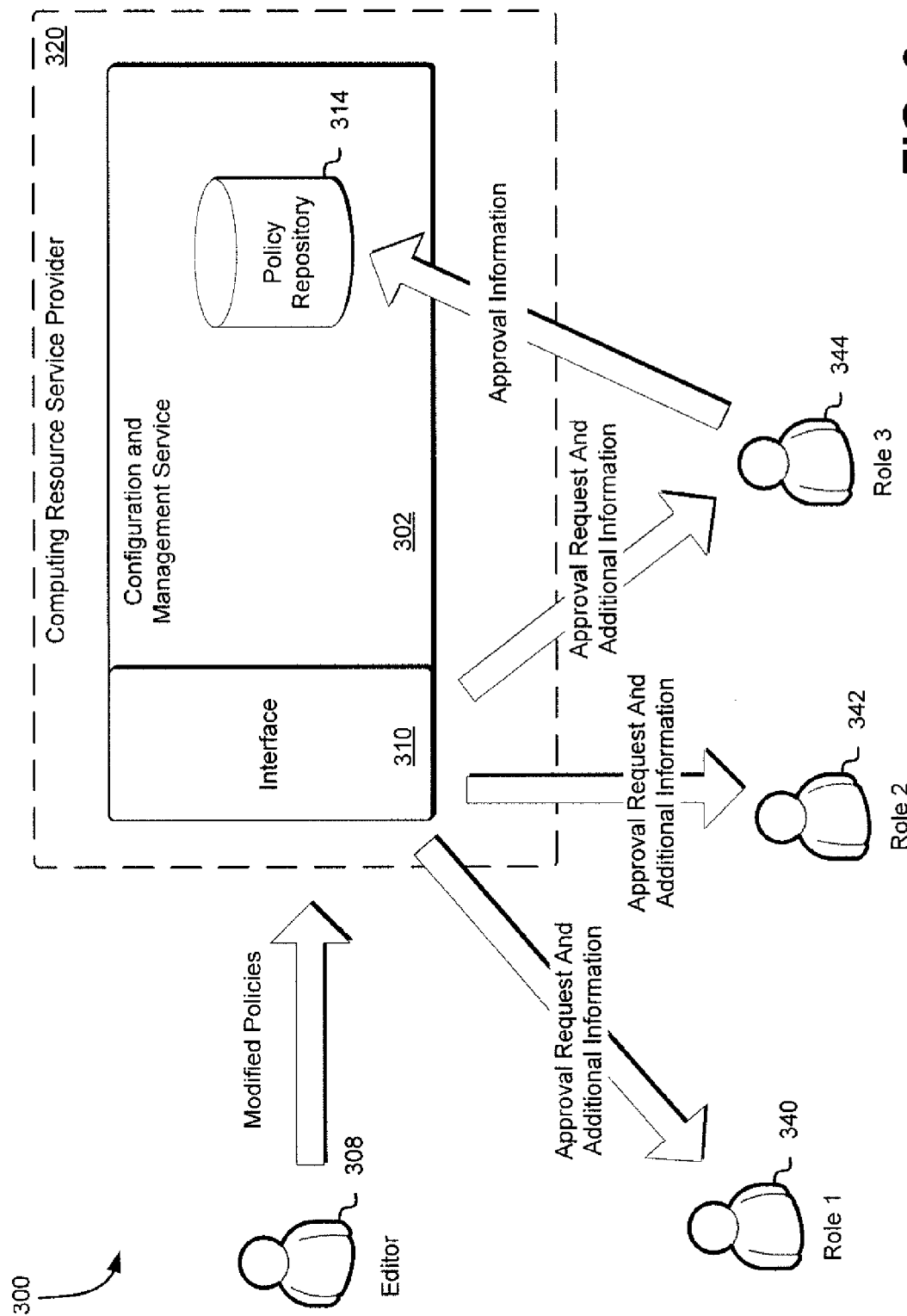
FIG. 3 illustrates an example environment in which various users may modify, review, and update permissions and/or policies in accordance with an embodiment.

FIG. 3 shows an illustrative example of an environment 300 in which approval for policy modification may be requested from plurality of users based at least in part on a role assigned to the user. A computing resource service provider 320 may operate a configuration management service 302 as a layer in front of a policy management system as described above. The configuration and management service 302 may include an interface, as described above, configured to receive request to interact with one or more policies and transmit requests in response to interactions with the one or more policies. The one or more policies may be maintained by the policy management service, not shown in FIG. 3 for simplicity. In various embodiments, the configuration and management service 302 sends an editor 308 a snapshot of the current state of the policy management service in response to a request from the editor 308 to create and/or modify the one or more policies. In yet other embodiments, the editor 308 may transmit a request to create and/or modify a particular policy. For example, the editor 308 may simply send API calls to the configuration and management service 302, the API calls may be configured to cause the configuration and management service 302 to perform various operations on particular policies indicated in the API call.

Once the configuration and management service 302 receives the modified one or more polices for the editor 308, the configuration and management service 302 may perform a variety of different operations including generating a description of the modified one or more policies, determining one or more modifications to the one or more policies, and determining a set of other users to provide with a notification and or additional information corresponding to the modified one or more policies. For example, the configuration and management service 302 may determine an authorizer or other delegated user to approve the modified one or more policies received.

As illustrated in FIG. 3, delegated users may be assigned various roles such as role 1 340, role 2 342, and role 3 344. Furthermore, a single delegated user may be assigned multiple roles, such as an author and authorizer. In some embodiments, a quorum of delegated users assigned to one or more roles may be required for approval of a particular interaction with the one or more policies. A quorum may include a set of delegated users that satisfy a set of quorum rules. For example, the set of quorum rules may require that at least three delegated users assigned role 1 340 must approve a modification to the policy. In another example, the quorum rules may require that at least one delegated user from role 2 343 approve the modifications to the policies and 75 percent of delegated users from role 3 344 approve the modifications to the policies.

The configuration and management service 302 may also generate a description of the modifications to the one or more policies submitted by the delegated users. Furthermore, the one or more policies submitted by the delegated users may include a description of the modification, the description generated by the delegated users responsible for modifying the one or more policies. In various embodiments, the configuration and management service 302 may collect data corresponding to modifications made by delegated users and determine patterns in creating, modifying, and interacting with policies. The configuration and management service 302 may use one or more computational processes to discover patterns in data sets collected from delegated users' interactions with the one or more policies. The computational processes may include artificial intelligence, machine learning, statistics, and database systems. The configuration and management service 302 may extract information from the data sets collected from delegated users' interactions with the one or more policies, the extracted information useable in providing additional information to delegated users. For example, the configuration and management service 302 may determine, based at least in part on the history of previous interactions with the one or more policies by delegated users, that approval is never given for modifications to the one or more policies that cause a new user to be created with administrative access rights. The configuration and management service 302 may provide this information to a delegated user attempting to create a new user with administrative access rights. The configuration and management service 302 may collect a variety of different information in order to determine this type of additional information including modifications made by delegated users, descriptions of modifications made, approval for modifications, edits or changes to modifications, rejections or disapproval of modifications, reasons provided for approvals or disapprovals, or any other information suitable for determining patterns of delegated user behavior and/or probabilities of certain behaviors given a particular input.

For example, the configuration and management service 302 may determine that only a small percentage of delegated users grants full permissions to a new user. The configuration and management service 302 may also determine an approval rate for a particular interaction with the one or more policies. For example, the configuration and management service 302 may determine that the approval rate for adding a new user across all authorized approvers of an organization is 75 percent. The configuration and management service 302 may then include the determined approval rate in additional information included in a notification to a particular approver that a new user has been added to the one or more polices which requires approval. The configuration and management service 302 may then determine a particular author has created a new user with full permissions granted, in response, the configuration and management service 302 may then notify the author or other delegated user that only a small percentage of delegate users grants full permissions to a new user. In another example, the configuration and management service 302 may determine that a particular set of modifications to the one or more policies may cause conflicts and/or errors. If the configuration and management service 302 detects the particular set of modifications, a notification may be sent to an authorizer, administrator, or other delegated user. In yet another example, the configuration and management service 302 may determine a particular editor has a higher chance of causing the configuration and management service 302 to restore a previous state of the one or more policies. As a result, the configuration and management service 302 may select a particular delegated user or set of delegated users to provide approval for the particular editor.

The configuration and management service 302 may include a policy repository 314 as described above in connection with FIG. 2. The policy repository 314 may further be configured to store information corresponding to approval and/or feedback information from delegated users. For example, as illustrated in FIG. 3, the delegated user assigned role 344 may provide approval of the modified policies to the configuration and management service 302; the configuration and management service 302 may store information corresponding to the approval in the policy repository 314 or other storage location, such as a database. The information corresponding to the approval may include a record of the policy, a version number, a mechanism used to receive approval, a denial, modifications made by the delegated user, an electronic signature corresponding to the delegated user, the modifications to the policy which are approved or denied, a result of the modifications to the policy, a time the approval was received, a number of approvals or denials received, or any other information suitable for maintaining an audit log of interactions with the configuration and management service 302. The feedback information may include any feedback provided by the delegated users, such as comments, corrections, interactions, or any other information associated with modifications to the policy.

The policy repository may further include a history of approved versions of the policy and a history of approval events that have occurred in connection with the policy. Approval events may include any notification transmitted to a delegated user and any response received as a result of transmitting the notification. Furthermore, the history information may include both the modified policy that was approved and any approvals received corresponding to the modified policy. The individual data objects in the record maintained by the policy repository may include an electronic signature of the delegated user responsible for the data object, or the entire record may be signed by the configuration and management service 302. The information stored in the policy repository may be electronically signed in order to provide an attestation of the information stored.

Figure 4:
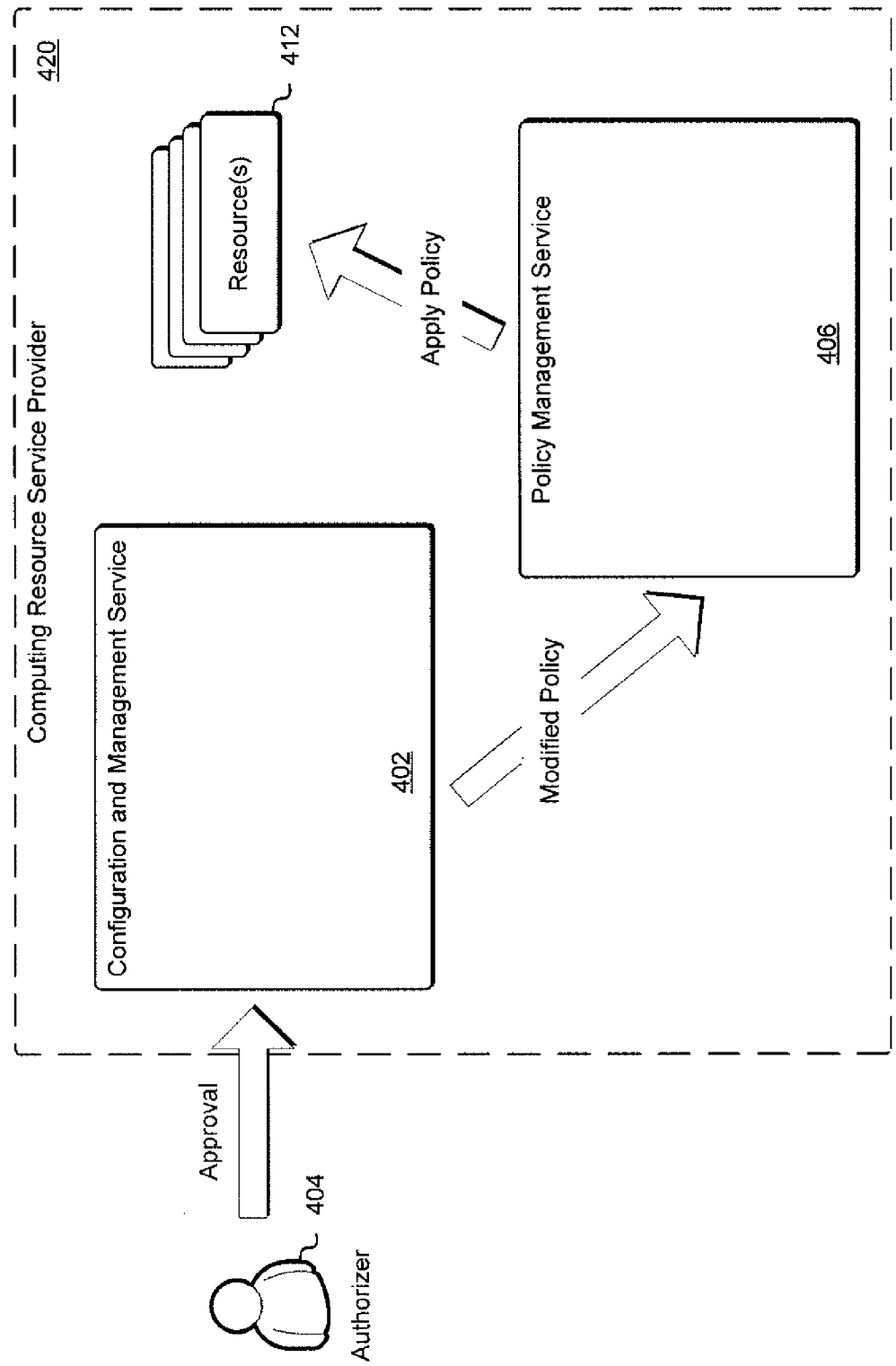
FIG. 4 illustrates an example environment in which approval of a policy may cause a configuration and management service to commit changes to an administrative service in accordance with an embodiment.

FIG. 4 shows an illustrative example of an environment 400 in which approval for one or more policies may be granted and, as a result, the one or more policies may be applied to a set of computing resources. An authorizer 404 may receive a notification that one or more policies have been created, modified, or otherwise interacted with. The notification may include the one or more policies, a description of the changes, and additional information as described above. For example, the notification may include a snapshot of the policies generated by a configuration and management service 402 and an indication that the particular modification made to the policies is approved by an authorizer 404 80 percent of the time. Although an authorizer 404 is shown in FIG. 4, any delegated user and role combination may be used to provide approval for one or more policies in accordance with the present disclosure.

Once approval is received, the configuration and management service 402 may commit the approved one or more policies to a policy management service 406, as described above. Committing the approved one or more policies may include a variety of different operations. For example, the configuration and management service provides the set of API calls generated by a first delegated user, such as an editor, and approved by a second delegated user, such as an administrator. In another example, the configuration and management service 402 may serialize a data structure, as described above, and provide the serialized data structure to the policy management service 406. Once the one or more policies are provided to the policy management service 406, the policy management service 406 may apply the one or more policies to the set of computing resources 412 as described above.

Figure 5:
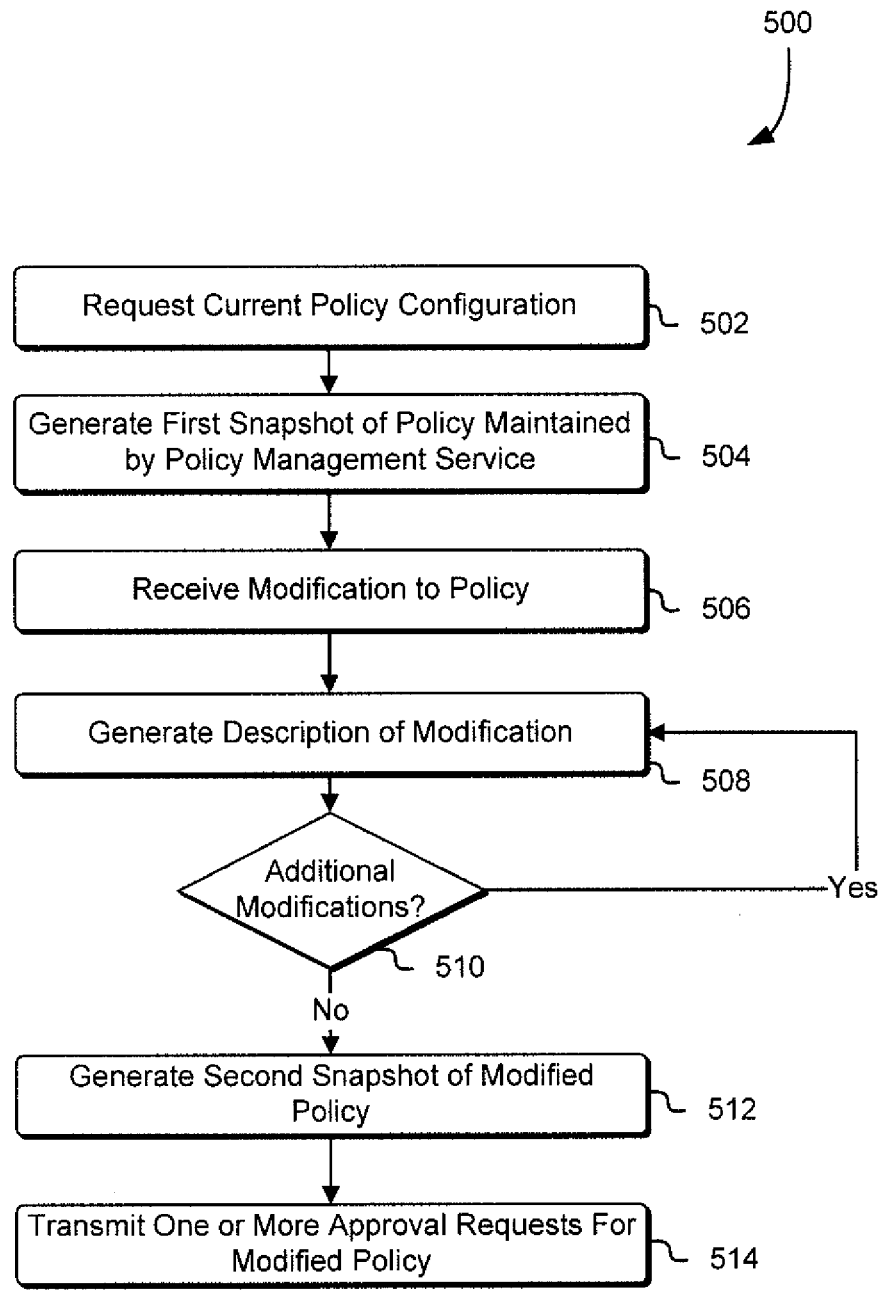
FIG. 5 shows an illustrative example of a process for receiving modifications to a policy that require approval in accordance with an embodiment.

FIG. 5 shows an illustrative example of the process 500 which may be used to provide a mechanism for reviewing and/or modifying one or more policies as well as providing approval for modifications to the one or more polices. The process 500 may be performed by any suitable system or combination of systems such as the configuration and management service described above in connection with FIG. 2. Returning to FIG. 5, in an embodiment, the process 500 includes receiving a request for the current policy configuration 502. The request may be generated by a delegated user, such as an editor, and received through an interface as described above in connection with FIG. 2. The request may be directed to the configuration and management service by a request listener or other listening device of a service provider.

In response to the request, the configuration and management service may generate a first snapshot of the policies maintained by the policy management service 504. For example, the configuration and management service or interface of the configuration and management service may transmit a request to the policy management service for the current state of the policies included in the request. The configuration and management service may then provide the requestor with information corresponding to the current state of the policy included in the request. The information corresponding to the current state may include a graphical representation of the user, roles, and/or permissions included in the policy. Returning to FIG. 5, the process 500 may include receiving modification to the policies 506. For example, the configuration and management service may receive one or more API calls configured to modify, create, or otherwise alter the polices. The received modifications may be in a format that is accepted by the policy management service. For example, the set of API calls received by the configuration and management service to modify the one or more polices may be the same set of API calls configured to cause the policy management service to modifying the one or more policies. The commands and/or instructions accepted by the configuration and management service may require the same syntax as the commands and/or instructions accepted by the policy management service. The syntax may include a set of rules that govern the structure of the commands and/or instructions accepted by both the configuration and management service as well as the policy management service.

The configuration and management service may then generate a description of the modifications to the policy 508. For example, the API call described above may include metadata generated by a delegated user describing the API call submitted to the configuration and management service. In another example, the configuration and management service may determine based at least in part on the API call and the parameters included in the API call a description of the modification. For example, the descriptions may include a list of the API calls and a description of each API call provided by the delegated user responsible for generating the API calls. In another example, the configuration and management service may determine a description of a result of the API calls (e.g., this API call will generate a new user with these access rights), based at least in part on the API calls submitted by the delegated user, and may provide the generated description to another delegated user for approval. The configuration and management service may then determine if additional modifications have been received 510. The additional modifications may be received from the same delegated user or another delegated user. For example, two editors may be interacting with the same policies near contemporaneously and may submit API calls modifying the policy at or around the same time.

If additional modifications are received, the configuration and management service may generate a description of the additional modifications. If no additional modifications are received, the configuration and management service may generate a second snapshot of the modified policies 512. The second snapshot may enable the configuration and management service to provide authorizers and other delegated users from which approval is required with information suitable for approving or denying the modification. Additionally, the first snapshot may enable the delegated user to restore the policies to a state prior to the approval of the modifications. Once the second snapshot has been created, the configuration and management service may transmit one or more approval requests for the modified policy 514. The request may include the second snapshot or other information configured to enable the approver to determine the modifications made to the policy as described above. Furthermore, the request may include additional information such as the generated description and/or information determined by the configuration and management service based at least in part on the interactions of other delegated users and/or customers. In numerous variations to the process 500, the configuration and management service processes the detected modifications. Processing the detected modifications may include a variety of operations such as generating a description of the modifications to the policies, determining one or more delegated users required for approval of the modifications, executing a simulation of the modifications, or any other operation suitable for enabling a delegated user to modify the one or more policies.

Figure 6:
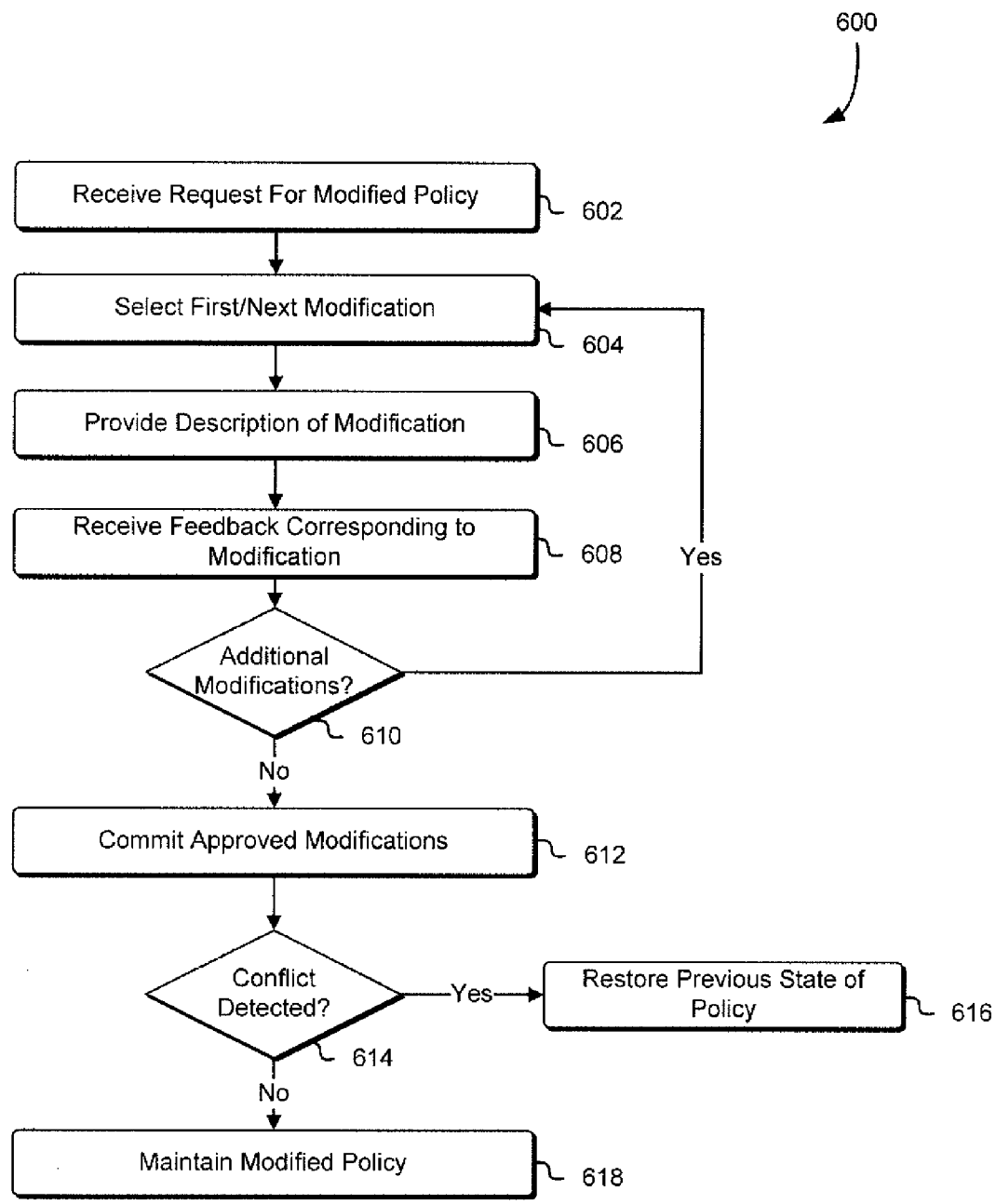
FIG. 6 shows an illustrative example of a process for providing approval of modification to a policy in accordance with an embodiment.

FIG. 6 shows an illustrative example of the process 600 which may be used to provide a mechanism for reviewing and/or modifying one or more policies as well as providing approval for modifications to the one or more polices. The process 600 may be performed by any suitable system or combination of systems such as the configuration and management service described above in connection with FIG. 2. Returning to FIG. 6, in an embodiment, the process 600 includes receiving a request for a modified policy 602. The request may be received from an administrator or other delegated user in response to a request for approval. For example, an editor may interact with a particular policy and as a result of the configuration and management service may transmit a request for approval of the modifications to the particular policy as a result of the interaction. In another example, the request may be received as a result of a delegated user selecting a uniform resource locator (URL) included in a message requesting approval for one or more policies. The URL may be a reference to computing resources associated with the configuration and management service.

Returning to FIG. 6, the configuration and management service may allow the delegated user from which approval was requested to select the first/next modification 604 to the policy. For example, the configuration and management service may provide a graphical user interface displayed through a web browser operated by the delegated user. Additionally, the delegated user may interact with the configuration and management service using API calls as described above. The configuration and management service may then provide the delegated user with a description of the modification 606. For example, as described above, the description may include the API call generated by the author of the modification. The delegated user may then provide feedback to the corresponding modification 608. For example, the delegated user may approve, deny, and/or provide comments and other feedback corresponding to the modifications. The delegated user's approval or denial may be included in an API call to the configuration and management service. Various graphical user interface elements, such as buttons, dialog boxes, and radio buttons, may be used to enable the delegated user to provide approval or denial of the modifications.

If there are additional modifications for approval 610, the configuration and management service may select the next modification for approval. If no additional modification requires approval the configuration and management service may commit the approved modification 612. As described above, committing the approved changes may cause the policy management service to apply the policies to one or more computing resources. In numerous variations to the process 600, the approved modification may be stored in a policy repository before being committed to the policy management service. If all of the modifications to the policies have been denied by the delegated user, the configuration and management service may not commit any modifications to the policy management service. In another variation to process 600, the configuration and management service may require a plurality of delegated users to approve the modification to the one or more policies before committing the modifications to the one or more policies to the policy management service.

During an interval of time in which the modified one or more policies are in effect (e.g., applied by the policy management service to one or more computing resources) errors and/or conflicts may be detected 614. Additionally, the conflict and/or errors in the modified one or more policies may be detected as a result of a simulation or test of the modified one or more policies as described above. If a conflict and/or error is detected 614 the configuration and management service may cause a previous state of the policy to be restored 616. For example, as described above, the configuration and management service may save the state of the policy prior to receiving a modification to the policy from an editor. If the modification made by the editor results in a conflict and/or error being detected, the configuration and management service may cause the saved state of the policy to be restored. In order to be restored to the previous state, the configuration and management service may transmit API calls to the policy management service as described above. In another example, a delegated user may select a particular version or state of the policy to be restored. If no conflict and/or error is detected the policy management system may maintain the modified policy 618. Maintaining the modified policy may include management of the computing resources and policies of the modified policy on behalf of the customer.

Figure 7:
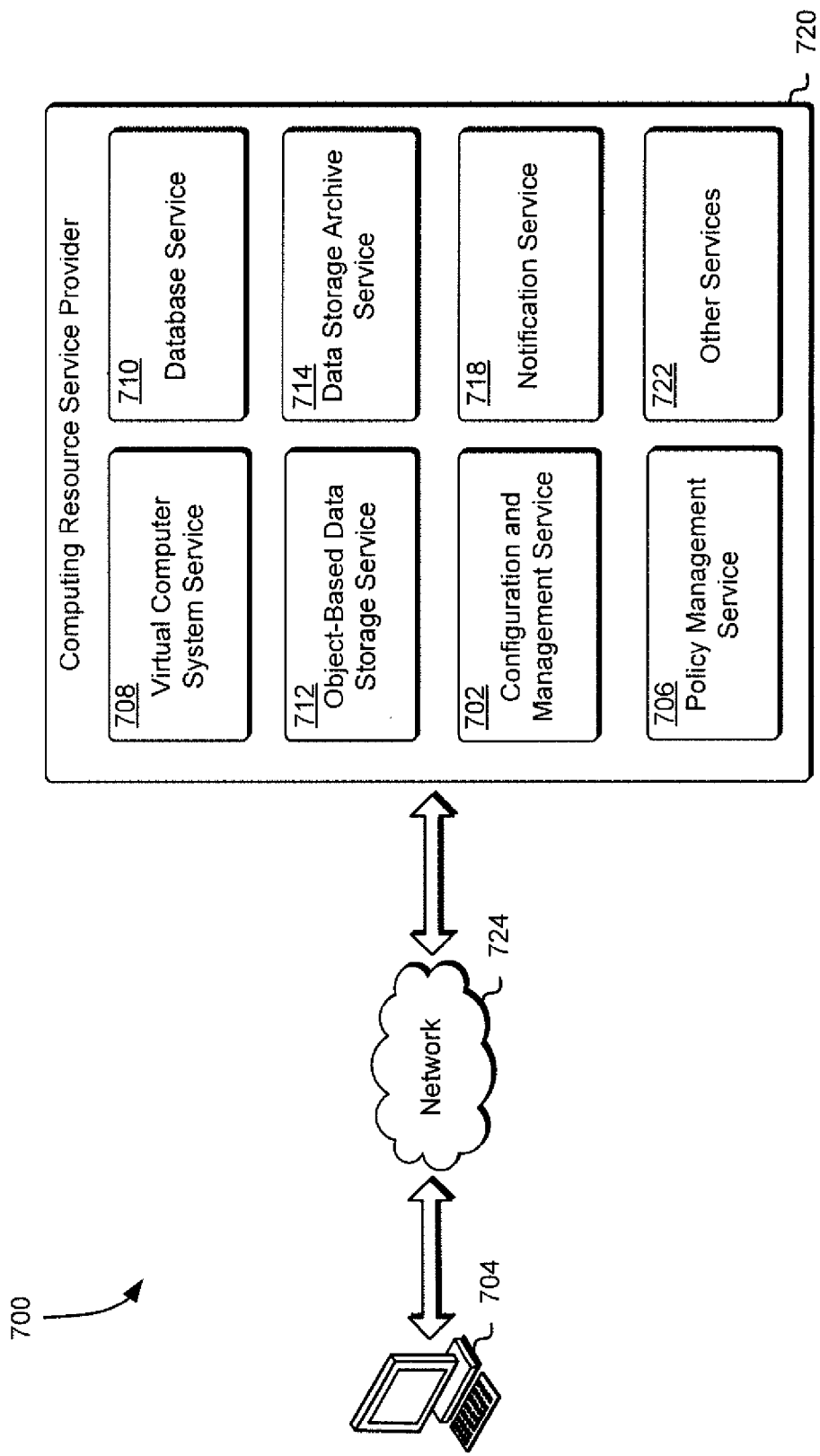
FIG. 7 shows an illustrative example of a computing resource service provider environment in accordance with an embodiment.

FIG. 7 shows an illustrated example of an environment 700 in which various embodiments of the present disclosure may be practiced. In the environment 700, a computing resource service provider 720 may provide a variety of services to a customer 704. The customer 704 may be an organization that may utilize the various services provided by the computing resource service provider 720 to remotely generate, test, and maintain one or more policies to define a level of access for users. As illustrated in FIG. 7, the customer 704 may communicate with the computing resource service provider 720 through one or more communications networks 724, such as the Internet. Some communications from the customer 704 to the computing resource service provider 720 may cause the computing resource service provider 720 to operate in accordance with various techniques described herein or variations thereof.

As noted above, a computing resource service provider 720 may provide various computing resource services to its customers. For instance, in this particular illustrative example, the computing resource service provider 720 provides various different services including a virtual computer system service 708, a database service 710, an object-based data storage service 712, a data storage archive service 714, a configuration and management service 702, a notification service 718, a policy management service 706, and one or more other services 722, although not all embodiments of the present disclosure will include all such services, and additional services may be provided in addition to or as an alternative to services explicitly described herein.

The virtual computer system service 708 may be a collection of computing resources configured to instantiate virtual machine instances onto virtual computer systems on behalf of the customers 704 of the computing resource service provider 720. Customers 704 of the computing resource service provider 720 may interact with the virtual computer system service 708 to provision and operate virtual computer systems that are instantiated on physical computing devices hosted (e.g., physical hosts) and operated by the computing resource service provider 720. The virtual computer systems may be used for various purposes, such as to operate as servers supporting a website. Other applications for the virtual computer systems may be to support database applications, electronic commerce applications, business applications and/or other applications.

The database service 710 may be a collection of computing resources that collectively operate to run one or more databases for one or more customers 704. Customers 704 of the computing resource service provider 720 may operate and manage a database from the database service 710 by utilizing appropriately configured API calls. This, in turn, may allow a customer 704 to maintain and potentially scale the operations in the database.

The object-based data storage service 712 may comprise a collection of computing resources that collectively operate to store data for a customer 704. The data stored in the data storage service 712 may be organized into data objects. The data objects may have arbitrary sizes except, perhaps, for certain constraints on size. Thus, the object-based data storage service 712 may store numerous data objects of varying sizes. The object-based data storage service 712 may operate as a key value store that associates data objects with identifiers of the data objects which may be used by the customer to retrieve or perform other operations in connection with the data objects stored by the object-based data storage service 712. Access to the object-based data storage service 712 may be through appropriately configured API calls.

The data storage archive service 714 may comprise a collection of computing resources that collectively operate to provide storage for data archiving and backup of customer data. The data storage archive service 714 may thus be configured to persistently store data that may be infrequently accessed and for which long retrieval times are acceptable to a customer 704 utilizing the service. A customer 704 may interact with the data storage archive service 714 to generate one or more archives. Each archive may represent one or more data files that may be combined to form the archive. Accordingly, a customer 704, through appropriately configured API calls to the service, may upload and retrieve archives from the data storage archive service 714 and monitor the retrieval of these archives, as each retrieval job may typically require several hours to complete.

The configuration and management service 702 may be a collection of computing resources configured to enable customers 704 to interact with one or more policies and receive approval for the one or more policies and/or modifications to the one or more policies, where the one or more policies control user access to computing resources offered by the computing resource service provider 720. For example, the one or more policies may control user access to the service described in connection with FIG. 7. The configuration and management service 702 may be configured to interact with other services of the service providers such as the notification service 718 and the policy management service 706.

The notification service 718 may be a collection of computing resources configured to enable customers 704 to send and receive notifications through a communications network 724. A customer 704 may utilize an interface, provided by the computing resource service provider 720, to create or subscribe to one or more subjects to which one or more messages may be published through. For instance, the configuration and management service 702 may transmit notifications to the customer 704 requesting approval for a particular modification to a policy. Accordingly, when a customer 704 approves of the modification, another notification may be transmitted to the configuration and management service indicating the customer's 704 approval.

The policy management service 706 may provide a variety of services to enable customers 704 to define a level of access to other services, such as those illustrated in FIG. 7, provided by the computing resource service provider 720, and to define a level of access to resources provided by the customers 704 and other entities. Accordingly, a customer 704 may access the policy management service 706 to create and manage one or more users and groups that may utilize the services provided by the computing resource service provider 720. A customer 704 may utilize the policy management service 706 to generate one or more policies, which may be used to define a level of access to resources and services. To generate these one or more policies, a customer 804 may access configuration and management service 702 in order to obtain approval for the one or more policies before committing the one or more policies to the policy management service 706.

Figure 8:
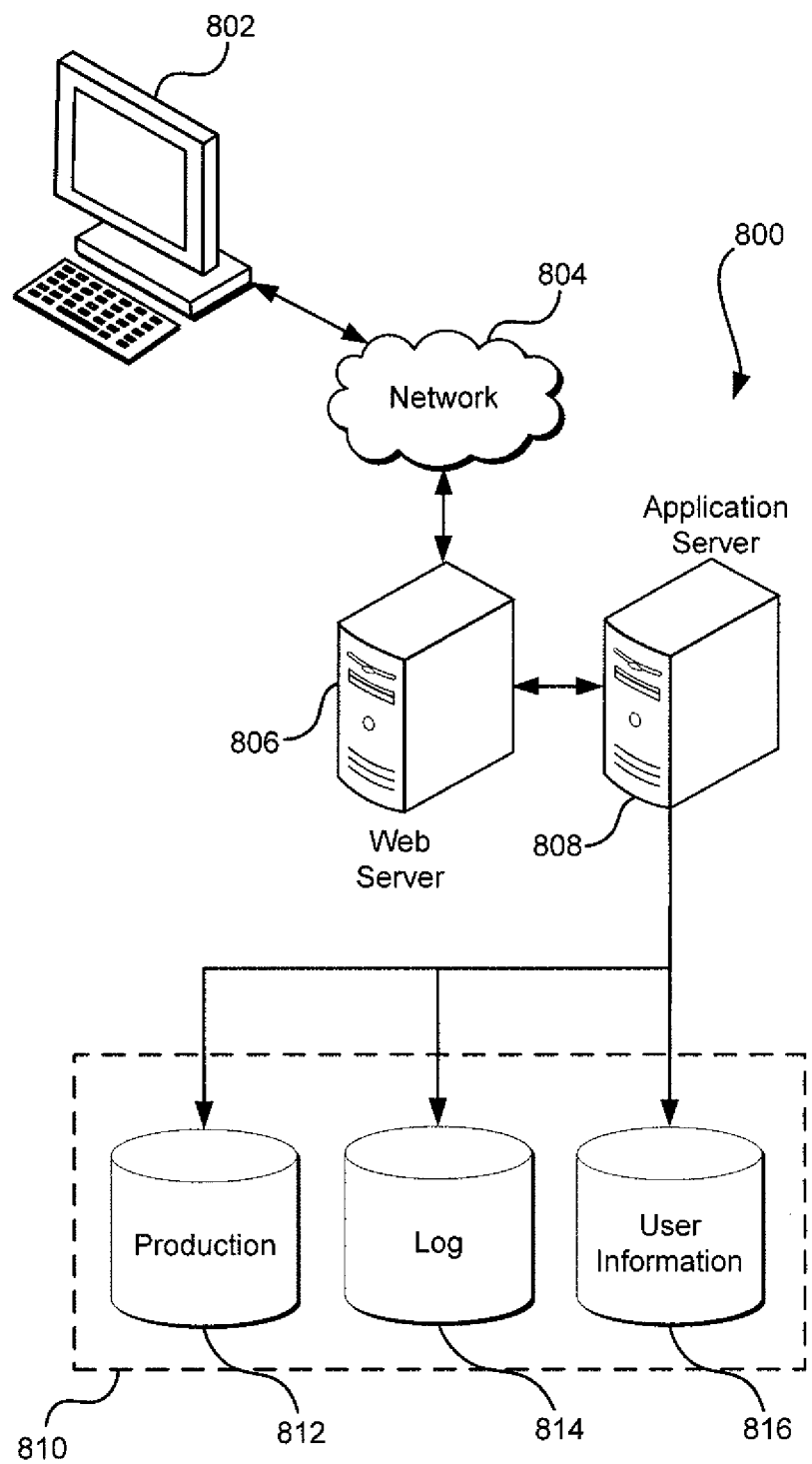
FIG. 8 illustrates an environment in which various embodiments can be implemented.

The computing resource service provider 720 may additionally maintain one or more other services 722 based at least in part on the needs of its customers 704. For instance, the computing resource service provider 720 may maintain a Domain Name System (DNS) service for its customers 704. A DNS service may be designed to give customers 704 a method to route end users to one or more communications network applications. For instance, the DNS service may be configured to translate human-readable names, such as uniform resource locators (URLs), into numeric Internet Protocol (IP) addresses that computer systems may use to connect to each other over the Internet. Thus, the DNS service may be configured to connect requests to access one or more services provided by the computing resource service provider 720 to infrastructure that is operating within a particular data zone. The DNS service may additionally be configured to route customers 704 of the computing resource service provider 720 to infrastructure outside of a particular data zone, such as another computing system operated by a separate provider. Other services include, but are not limited to, authentication services and services that manage other services. FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems each having one or more hardware processors configured with executable instructions including,
obtaining a current state of a policy from a policy management service, where the policy management service is operable to put the policy into effect, and the policy defines permissions for access to a set of computing resources;
receiving a request to modify the policy, the request specifies a modification to the current state of the policy and application of the modification creates a modified policy;
determining a description of the modification to the current state of the policy based at least in part on the specified modifications to the current state of the policy;
transmitting a notification that includes the determined description;
receiving an approval of the modification from an entity of a set of entities authorized to approve modifications to the policy;
contingent of receiving a first number of approvals from a second number of entities of the set of entities authorized to approve modifications to the policy, where the first number is greater than one and less than the second number, transmitting an instruction to the policy management service to put the modified policy into effect; and
detecting an error with the modified policy.

2. The computer-implemented method of claim 1, wherein the request is formatted in a manner that the policy management service supports.

3. The computer-implemented method of claim 1, wherein the entity authorized to approve modifications to the policy is different from a second entity responsible for the modification to the policy.

4. A system, comprising:
one or more processors; and
memory with instructions that, as a result of execution by the one or more processors, cause the system to:
obtain a current state of a policy from a policy management service, where the policy management service is operable to put the policy into effect, and the policy defines permissions for access to a set of computing resources;
receive a request to modify the policy, the request specifies a modification to the current state of the policy and application of the modification creates a modified policy;
determine a description of the modification to the current state of the policy based at least in part on the specified modifications to the current state of the policy;
transmit a notification that includes the description;
receive an approval of the modification from an entity of a set of entities authorized to approve modifications to the policy;
contingent of receiving a first number of approvals from a second number of entities of the set of entities authorized to approve modifications to the policy, where the first number is greater than one and less than the second number, transmit an instruction to the policy management service to put the modified policy into effect; and
detect an error with the modified policy.

5. The system of claim 4, wherein the memory further includes instructions that, as a result of execution by the one or more processors, cause the system to store, in a repository, the current state of the policy.

6. The system of claim 4, wherein:
the memory further includes instructions that, as a result of execution by the one or more processors, cause the system to execute a simulation of the modified policy and, as a result of detection of the error, restore a previous version of the policy; and
wherein the error is detected as a result of the simulation.

7. The system of claim 4, wherein the memory further includes instructions that, as a result of execution by the one or more processors, cause the system to transmit a set of application programming interface calls that cause the policy management service to enforce the modified policy, where application programming interface calls accepted by the system are of a first format and application programming interface calls accepted by the policy management service are also of the first format.

8. The system of claim 4, wherein the memory further includes instructions that, as a result of execution by the one or more processors, cause the system to serialize the modification into a structured format suitable for enforcement by the policy management service.

9. The system of claim 4, wherein the notification is transmitted to the entity as a result of the entity being authorized to provide approval for modified policy.

10. The system of claim 4, wherein the instruction is contingent upon a successful simulation of the policy including the modification.

11. The system of claim 4, wherein:
the memory further includes instructions that, as a result of execution by the one or more processors, cause the system to receive, from an second entity different from the entity, instructions to apply the modification; and
transmission of the instruction to the policy management service is triggered by receipt of the first number of approvals.

12. A non-transitory computer-readable storage medium having stored thereon executable instructions that, as a result of execution by one or more processors of a computer system, cause the computer system to at least:
obtain a current state of a policy from a policy management service, where the policy management service is operable to put the policy into effect, and the policy defines permissions for access to a set of computing resources;
receive a request to modify the policy, the request specifies a modification to the current state of the policy and application of the modification creates a modified policy;
determine a description of the modification to the current state of the policy based at least in part on the specified modifications to the current state of the policy;
transmit a notification that includes the description;
receive an approval of the modification from an entity of a set of entities authorized to approve modifications to the policy;
contingent of receiving a first number of approvals from a second number of entities of the set of entities authorized to approve modifications to the policy, where the first number is greater than one and less than the second number, transmit an instruction to the policy management service to put the modified policy into effect; and
detect an error with the modified policy.

13. The non-transitory computer-readable storage medium of claim 12, wherein the approval includes an electronic signature attesting to an identity of an operator of the entity.

14. The non-transitory computer-readable storage medium of claim 12, wherein the instructions further comprise instructions that, as a result of execution by the one or more processors, cause the computer system to obtain, from the policy management service, the current state of the policy prior to the modification.

15. The non-transitory computer-readable storage medium of claim 12, wherein the instructions further comprise instructions that, as a result of execution by the one or more processors, cause the computer system to generate a restore point based at least in part on the current state of the policy prior to the modification.

16. The non-transitory computer-readable storage medium of claim 12, wherein the current state of the policy includes at least some encrypted data, wherein the encrypted data may only be decrypted by the policy management service.

17. The non-transitory computer-readable storage medium of claim 12, wherein the instructions further comprise instructions that, as a result of execution by the one or more processors, cause the computer system to transmit an instruction to another computer system to replicate interaction with the policy for the modification.

18. The non-transitory computer-readable storage medium of claim 12, wherein the description indicates one or more changes to the policy resulting from interaction with the policy.

19. The non-transitory computer-readable storage medium of claim 12, wherein the notification indicates an approval rate for the modification.

* * * * *